(12) United States Patent
Park (10) Patent No.: US 11,491,912 B2
(45) Date of Patent: Nov. 8, 2022

(54) VEHICLE LIGHTING DEVICE AND METHOD OF CONTROLLING LUMINANCE THEREOF

(71) Applicants: HYUNDAI MOTOR COMPANY, Seoul (KR); KIA MOTORS CORPORATION, Seoul (KR)

(72) Inventor: Chongbae Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 154 days.

(21) Appl. No.: 17/121,166

(22) Filed: Dec. 14, 2020

(65) Prior Publication Data
US 2022/0048430 A1   Feb. 17, 2022

(30) Foreign Application Priority Data
Aug. 13, 2020 (KR) .......... 10-2020-0102046

(51) Int. Cl.
| | | |
|---|---|---|
| B60Q 3/80 | (2017.01) | |
| G06T 7/00 | (2017.01) | |
| B60Q 3/252 | (2017.01) | |
| B60Q 3/76 | (2017.01) | |
| H05B 47/11 | (2020.01) | |
| B60Q 3/10 | (2017.01) | |
| B60Q 3/18 | (2017.01) | |

(52) U.S. Cl.
CPC .......... *B60Q 3/80* (2017.02); *B60Q 3/10* (2017.02); *B60Q 3/18* (2017.02); *B60Q 3/252* (2017.02); *B60Q 3/76* (2017.02); *G06T 7/0012* (2013.01); *H05B 47/11* (2020.01); *G06T 2207/30041* (2013.01)

(58) Field of Classification Search
CPC ... B60Q 3/80; B60Q 3/16; B60Q 3/18; B60Q 3/70; F21W 2106/00
See application file for complete search history.

(56) References Cited

U.S. PATENT DOCUMENTS 7,946,744 B2 * 5/2011 Omi ................ G06V 40/19
362/490
2021/0389820 A1 * 12/2021 Bohdan .............. H04N 5/23219

FOREIGN PATENT DOCUMENTS

KR         101393349 B1    5/2014

* cited by examiner

*Primary Examiner* — Robert J May
(74) *Attorney, Agent, or Firm* — Lempia Summerfield Katz LLC (57) ABSTRACT

A vehicle lighting device and a method of controlling luminance thereof are provided. The vehicle lighting device includes a camera module configured to capture an image of the driver's face, a sensing unit configured to detect the surroundings of a vehicle, a lighting unit including at least one light source to illuminate the interior of the vehicle, and a controller. The controller is configured to acquire information on a daytime mode and a nighttime mode through the sensing unit, to acquire information on an infrared brightness level or information on the size of the pupil of the driver's eye based on the image of the driver's face captured by the camera module, and to control the luminance of the lighting unit in response to the acquired information.

16 Claims, 6 Drawing Sheets

| BRIGHTNESS LEVEL | DUTY RATIO(%) IN DAYTIME MODE | DUTY RATIO(%) IN NIGHTTIME MODE | REMARKS |
|---|---|---|---|
| 1 | 36.00 | 1.30 | – |
| 2 | 37.82 | 1.55 | – |
| 3 | 39.74 | 1.85 | – |
| 4 | 41.75 | 2.21 | – |
| 5 | 43.86 | 2.63 | – |
| 6 | 46.08 | 3.14 | – |
| 7 | 48.42 | 3.74 | – |
| 8 | 50.87 | 4.46 | – |
| 9 | 53.44 | 5.32 | – |
| 10 | 56.15 | 6.35 | – |
| 11 (Δ1:↓) | 58.99 | 7.57 | – |
| 12 (Default) | 61.97 | 9.03 | – |
| 13 | 65.11 | 10.78 | – |
| 14 (Δ1:↑) | 68.41 | 12.85 | – |
| 15 | 71.87 | 15.33 | – |
| 16 | 75.51 | 18.28 | – |
| 17 | 79.33 | 21.81 | – |
| 18 | 83.35 | 26.01 | – |
| 19 | 87.57 | 31.02 | – |
| 20 | 92.00 | 37.00 | – |
| 21 (Detent) ※APPLICATION | 92.00 | 92.00 | – |

FIG. 7

IMAGE OF
DRIVER'S PUPIL

ANALYSIS OF
IRIS AREA

CHANGE IN
SIZE OF IRIS
(CHECK CHANGE IN VALUE)

VEHICLE LIGHTING DEVICE AND METHOD OF CONTROLLING LUMINANCE THEREOF

This application claims the benefit of and priority to Korean Patent Application No. 10-2020-0102046, filed on Aug. 13, 2020, which is hereby incorporated by reference as if fully set forth herein.

BACKGROUND

Field of the Disclosure

The present disclosure relates to a vehicle lighting device and a method of controlling luminance thereof, and more particularly to a vehicle lighting device using an infrared camera and to a method of controlling luminance thereof.

Discussion of the Related Art

In general, a vehicle is equipped with a vehicle lighting device for stably securing a driver's field of view or notifying other vehicles of the traveling state of the vehicle when traveling in a dimly lit environment.

Such a vehicle lighting device operates according to the traveling state of a vehicle in order to secure the driver's safety. Such a vehicle lighting device includes headlights mounted to the front side of the vehicle and taillights mounted to the rear side of the vehicle.

The headlights mainly serve to illuminate the area in front of the vehicle when the vehicle travels at night.

The taillights include a brake lamp, which is turned on when the driver operates a brake system and include a turn-signal lamp, which indicates the direction in which the vehicle is to turn.

Generally, the human eye is sensitive even to low-intensity light in environments in which the amount of light is small (e.g. at nighttime), but is insensitive even to high-intensity light in environments in which the amount of light is large (e.g. during the daytime).

Therefore, if the vehicle lighting device emits a constant intensity of light regardless of the time of day, the driver may suffer from eye fatigue due to the relatively high light intensity when driving at night, and may suffer from poor visibility due to the relatively low light intensity when driving during the daytime, which may cause an accident.

In order to solve the above problems, there has been proposed a method of controlling a vehicle lighting device, which is disclosed in Korean Patent Registration No. 10-1393349. According to this conventional control method, the intensity of light emitted from the vehicle lighting device varies according to the luminance or the weather conditions outside the vehicle.

Described in more detail, according to the conventional method of controlling a vehicle lighting device, when the detected luminance outside the vehicle falls within a predetermined luminance range, a first lamp radiates light having a predetermined intensity corresponding to the luminance range. When it is detected that fog is present in the environment around the vehicle, a second lamp is turned on.

In addition, according to the conventional method of controlling a vehicle lighting device, when it is detected that the brake system of the vehicle is operating, a third lamp radiates light having a predetermined intensity corresponding to the detected luminance. When it is detected that it is raining outside the vehicle and the detected amount of rainfall is within a predetermined rainfall amount range, the second lamp is turned on. When the brake system operates while traveling in the rain, the third lamp radiates light having a predetermined intensity corresponding to the detected amount of rainfall.

However, in the conventional method of controlling a vehicle lighting device, a large number and variety of sensor modules are required in order to detect the surroundings of the vehicle, and the logic for controlling the sensor modules is very complicated.

Therefore, the conventional method of controlling a vehicle lighting device may increase the cost of manufacturing the vehicle due to the application of a large number and variety of sensor modules, and may cause quality degradation and frequent occurrence of errors due to complicated logic.

In addition, according to the conventional method of controlling a vehicle lighting device, the luminance of the vehicle lighting device, which is controlled by the determination logic in response to the detected surroundings of the vehicle, may be somewhat different from the luminance that is desired by the driver in the actual situation around the vehicle.

SUMMARY

Accordingly, the present disclosure is directed to a vehicle lighting device and a method of controlling luminance thereof that substantially obviate one or more problems due to limitations and disadvantages of the related art.

An object of the present disclosure is to provide a vehicle lighting device and a method of controlling luminance thereof. The vehicle lighting device and method are capable of appropriately controlling luminance suitable for a driver in a daytime-driving mode and a nighttime-driving mode using a camera for monitoring the driver without using a separate luminance sensor.

However, the objects to be accomplished by the embodiments are not limited to the above-mentioned objects. Other objects not mentioned herein should be clearly understood by those having ordinary skill in the art to which the embodiments pertain from the following description.

In order to accomplish the above and other objects, a vehicle lighting device according to an embodiment of the present disclosure is provided. The vehicle lighting device may include: a camera module configured to capture an image of the driver's face; a sensing unit configured to detect the surroundings of a vehicle; a lighting unit including at least one light source to illuminate the interior of the vehicle; and a controller. The controller may be configured: to acquire information on a daytime mode and a nighttime mode through the sensing unit; to acquire information on an infrared brightness level or information on the size of the pupil of the driver's eye based on the image of the driver's face captured by the camera module; and to control the luminance of the lighting unit in response to the acquired information.

In order to accomplish the above and other objects, a method of controlling luminance of a vehicle lighting device according to a first embodiment of the present disclosure is provided. The method may include: determining a daytime mode or a nighttime mode based on an ambient luminance detected by an luminance sensor; capturing an image of the face of the driver through a camera module and repeatedly measuring an infrared brightness level from the captured image of the face of the driver; and controlling the luminance of a lighting unit for the daytime mode or the nighttime mode in response to a change in the measured infrared brightness level.

In order to accomplish the above and other objects, a method of controlling luminance of a vehicle lighting device according to a second embodiment of the present disclosure is provided. The method may include: determining a daytime mode or a nighttime mode based on an ambient luminance detected by an luminance sensor; capturing an image of the pupil of the driver through a camera module and repeatedly measuring the size of the pupil of the driver in the captured image; and controlling the luminance of a lighting unit for the daytime mode or the nighttime mode in response to a change in the measured size of the pupil of the driver.

In order to accomplish the above and other objects, a method of controlling luminance of a vehicle lighting device according to a third embodiment of the present disclosure is provided. The method may include: determining a daytime mode or a nighttime mode based on an ambient luminance detected by an luminance sensor; capturing an image of the face of the driver through a camera module and repeatedly measuring an infrared brightness level from the captured image of the face of the driver; capturing an image of the pupil of the driver through the camera module and repeatedly measuring a size of the pupil of the driver in the captured image; calculating a change in the measured infrared brightness level; calculating a change in the measured size of the pupil of the driver; and controlling the luminance of a lighting unit for the daytime mode or the nighttime mode in response to the calculated change in the infrared brightness level and the calculated change in the size of the pupil of the driver.

The controlling the luminance of the lighting unit may include: establishing a lookup table in which a plurality of levels based on which the luminance of the lighting unit is controlled is set and in which duty ratios at which the lighting unit is driven in the daytime mode and the nighttime mode are respectively set in the plurality of levels; selecting a level by lowering or raising a current level, among the plurality of levels, in response to a change in the infrared brightness level and/or a change in the size of the pupil of the driver; and driving the lighting unit at a duty ratio of a daytime mode or a nighttime mode corresponding to the selected level.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Advantages and features of the present disclosure and methods for achieving them should be made clear from embodiments described below in detail with reference to the accompanying drawings. The present disclosure may, however, be embodied in many different forms, and should not be construed as being limited to the embodiments set forth herein. Rather, these embodiments are provided so that this disclosure is thorough and complete, and fully conveys the scope of the disclosure to those having ordinary skill in the art. The present disclosure is defined by the scope of the claims.

The terminology used herein is for the purpose of describing particular embodiments only and is not intended to be limiting of embodiments of the disclosure. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated components, steps, operations, and/or elements, but do not preclude the presence or addition of one or more other components, steps, operations, and/or elements.

A vehicle lighting device according to an embodiment of the present disclosure controls luminance to be suitable for the driver according to the brightness level and the size of the driver's pupil. The vehicle lighting device does so by use of a camera module for monitoring the driver in the interior of the vehicle, rather than a large number and variety of sensor modules mounted in the vehicle, thereby improving the driver's visibility and reducing eye fatigue.

Hereinafter, an embodiment of a vehicle lighting device and a method of controlling luminance thereof according to the present disclosure are described in detail with reference to the accompanying drawings.

Figure 1:
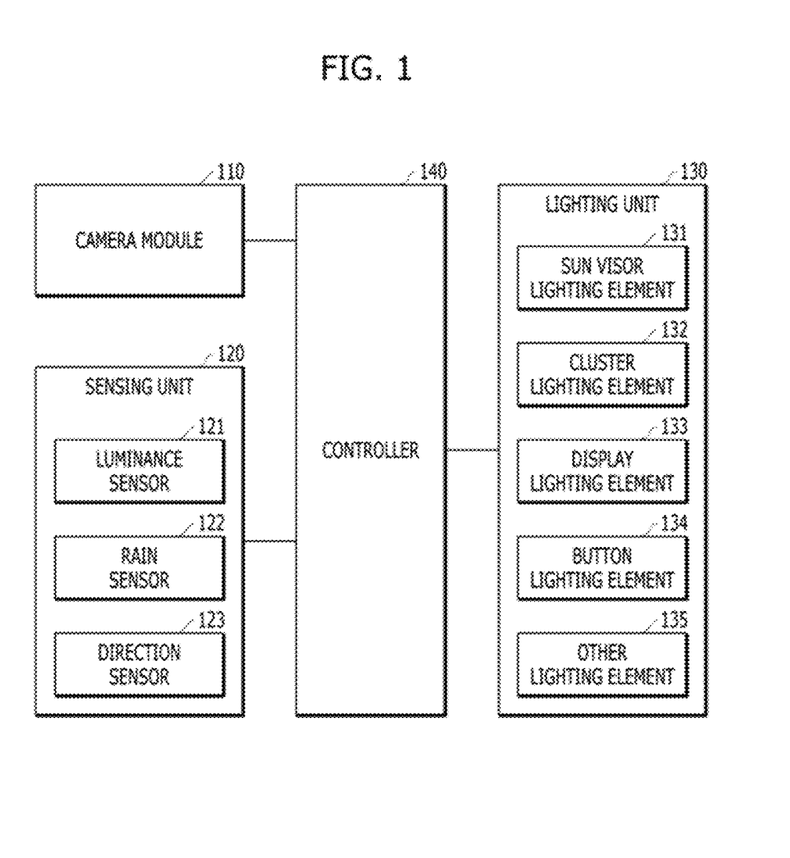
FIG. 1 is a block diagram showing an example of the configuration of a vehicle lighting device according to an embodiment of the present disclosure.

FIG. 1 is a block diagram showing an example of the configuration of a vehicle lighting device according to an embodiment of the present disclosure.

As shown in FIG. 1, the vehicle lighting device according to an embodiment of the present disclosure may broadly include a camera module 110, a sensing unit 120, a lighting unit 130, and a controller 140.

In one example, the camera module 110 may be disposed at a position at which it is possible to capture an image of at least the eyes of the driver in the vehicle. In some embodiments, two or more camera modules may be provided. For example, when it is intended to photograph the driver, the camera module 110 may be disposed at the A-pillar in front of the driver's seat, at the sun visor in front of the driver's seat, at the interior mirror, at the instrument cluster, or at any other part near the driver so as to capture an image of at least the eyes of the driver. However, this is merely given by way of example, and the embodiment is not limited thereto. In addition, the camera module 110 may have a field of view within which it is possible to capture the size of the eyes of the driver at the mounting position thereof, without being limited thereto.

The camera module 110 captures an image of the eyes of the driver in the vehicle in response to a control signal from the controller 140. The camera module 110 transmits the captured image of the eyes of the driver to the controller 140.

The sensing unit 120 may include at least one of a luminance sensor 121 for measuring luminance, a rain sensor 122 for detecting rainfall or snowfall, or a direction sensor 123.

The luminance sensor 121 may be used to implement an auto-lighting function of automatically controlling the external headlights depending on the time of day.

The rain sensor 122 may be used to control the operation of the wiper in response to rainfall or snowfall.

The direction sensor 123 may be used to determine the direction in which the vehicle is traveling. The direction sensor 123 may include a gyro sensor, a global positioning sensor (GPS), and/or a geomagnetic sensor, without being limited thereto. In some embodiments, the direction sensor 123 may further have a function of detecting the vehicle speed. The vehicle speed may be determined using GPS information or the value of a speed sensor (not shown).

The lighting unit 130 may include at least one light source capable of radiating light to the interior of the vehicle. For example, the lighting unit 130 may include a sun visor lighting element 131, a cluster lighting element 132, a display lighting element 133, a button lighting element 134, and/or other lighting elements 135. In this case, the individual lighting elements 131, 132, 133, 134 and 135 constituting the lighting unit 130 may be configured to change in at least one of luminance or color. In the case in which the individual lighting elements 131, 132, 133, 134 and 135 have fixed luminance or color, it is possible to change the indoor illumination environment through individual on/off control thereof.

The sun visor lighting element 131 may be disposed near the sun visor of the vehicle and may be turned on when the sun visor is unfolded downwards from a folded state or when a mirror is exposed by moving a mirror cover. The mirror cover may be omitted, depending on the vehicle.

In the case of an analog-type cluster, the cluster lighting element 132 may be implemented in the form of a backlight. In the case of a digital-display-type cluster, the cluster lighting element 132 may be implemented not only in the form of a backlight but also in a form that is capable of changing the shapes, arrangement positions, background colors, and themes of the displayed elements (e.g. gauges, dials, and warning lights). However, the embodiment is not limited thereto.

The display lighting element 133 may be used to illuminate the display of an audio/video/navigation (AVN) system and the display of an air-conditioning system. The display lighting element 133 may be controlled in a manner similar to that in which the digital-display-type cluster lighting element 132 is controlled.

The button lighting element 134 may be a lighting element mounted inside, for example, a push button, a dial, or a touch button.

The other lighting elements 135 may include a mood lamp, an ambient lamp, and/or a map lamp. Here, the map lamp generally refers to a lamp disposed between the sun visor in front of the driver's seat and the sun visor in front of the passenger seat (or at the upper end of the interior mirror). The configuration of the other lighting elements 135 is merely an example and is not limited to any type of lighting element that is not included in the above-described lighting elements 131, 132, 133 and 134.

The controller 140 may acquire data necessary for controlling the lighting unit 130 from the camera module 110 and the sensing unit 120. The controller 140 may control the lighting unit 130 based on the acquired data. To this end, the controller 140 may store data on the infrared (IR) brightness level received from the camera module 110, data on the driver's eyes captured by the camera module 110, and data on the traveling environment of the vehicle detected by the sensing unit 120.

In other words, the controller 140 may acquire information on the time of day (e.g. daytime or nighttime) through the luminance sensor 121 of the sensing unit 120, information on the IR brightness level from the camera module 110, and information on the size of the iris (pupil) of the driver's eyes captured by the camera module 110. The controller 140 may control the respective components of the lighting unit 130 based on the acquired information. The concrete control process of the controller 140 is described below.

Figure 2:
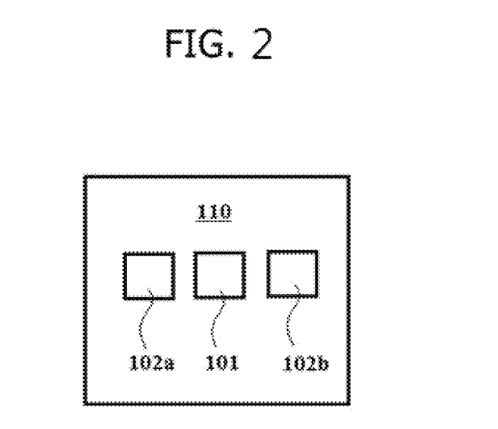
FIG. 2 is a detailed configuration diagram of the camera module 110 of FIG. 1.

FIG. 2 is a detailed configuration diagram of the camera module 110 of FIG. 1.

As shown in FIG. 2, the camera module 110 includes a camera 101 for capturing an image and includes first and second IR light-emitting diodes (LEDs) 102a and 102b. The LEDs 102a and 102b are provided on opposite sides of the camera 101 to emit light in an IR wavelength range of 900 nm to 980 nm in order to identify the driver's face.

Hereinafter, a method of controlling the vehicle lighting device according to the present disclosure, configured as described above, is described.

Figure 3:
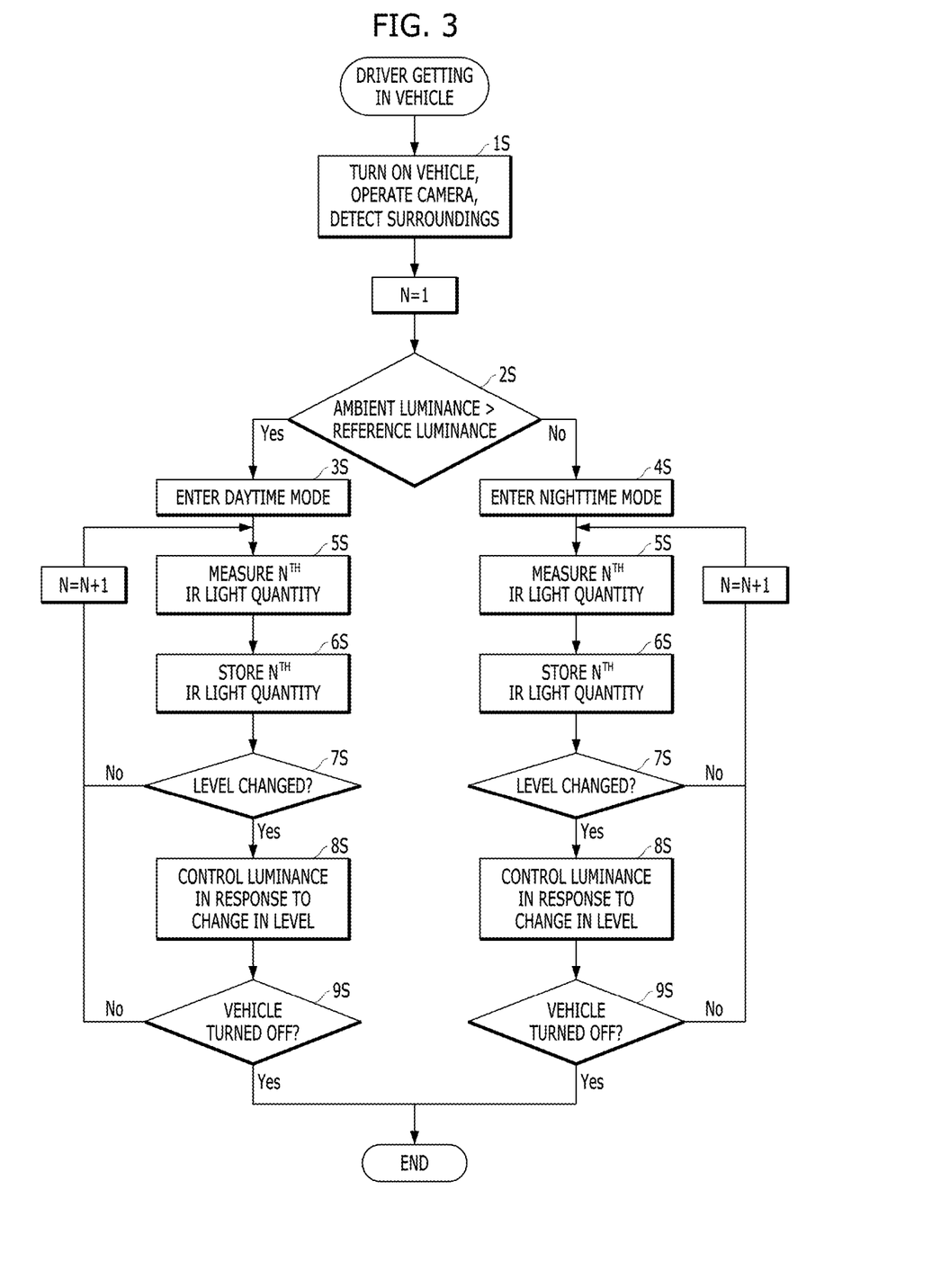
FIG. 3 is a flowchart showing an example of a control process of the vehicle lighting device according to a first embodiment of the present disclosure.
Figure 4:
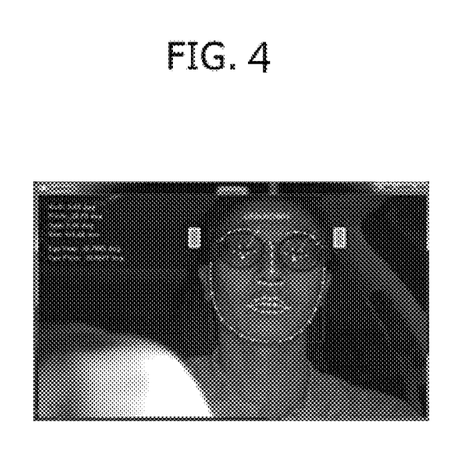
FIG. 4 is a picture for explaining a specific point in the image of the driver's face captured by a camera module 110.

FIG. 3 is a flowchart showing an example of a control process of the vehicle lighting device according to a first embodiment of the present disclosure. FIG. 4 is a picture for explaining a specific point in the image of the driver's face captured by the camera module 110.

In the method of controlling the vehicle lighting device according to the first embodiment of the present disclosure, as shown in FIG. 3, when the vehicle is turned on, power is supplied to the controller 140, the camera module 110, and the sensing unit 120. This operates the vehicle lighting device according to the present disclosure (1S).

The controller 140 compares the ambient luminance detected by the luminance sensor 121 of the sensing unit 120 with a reference luminance (2S).

Upon determining that the ambient luminance detected by the luminance sensor 121 is higher than the reference luminance, the controller 140 enters a daytime mode (3S). Upon determining that the ambient luminance detected by the luminance sensor 121 is equal to or lower than the reference luminance, the controller 140 enters a nighttime mode (4S).

In the daytime mode, the headlights of the vehicle are turned off. In the nighttime mode, the headlights of the vehicle are automatically turned on.

The camera module 110 captures an image of the driver's face and transmits the captured image to the controller 140.

As shown in FIG. 4, in the daytime mode or the nighttime mode, the controller 140 measures, depending on the number of specific points appearing in the captured image of the driver's face, the IR brightness level of the $N^{th}$ point (the IR light quantity of the camera) (5S). The controller 140 then stores the measured brightness level (IR light quantity) (S6).

This process is performed at least twice in order to determine whether or not the measured brightness level (IR light quantity) has changed (7S).

When it is determined in step 7S that the brightness level (IR light quantity) has not changed, the current luminance of the lighting unit 130 is maintained.

When it is determined in step 7S that the brightness level (IR light quantity) has changed, the luminance of the lighting unit 130 is controlled in response to the change in the brightness level (8S).

The steps 5S-8S are repeated in order to control the luminance of the lighting unit 130 in response to a change in the brightness level (IR light quantity).

The above-described process is repeated in order to control the luminance of the lighting unit 130 in response to a change in the brightness level. When the vehicle is turned off, the process of controlling the vehicle lighting device according to the first embodiment of the present disclosure is terminated (9S).

The method of controlling the luminance of the lighting unit 130 in response to the change in the brightness level is described below in more detail.

Figure 5:
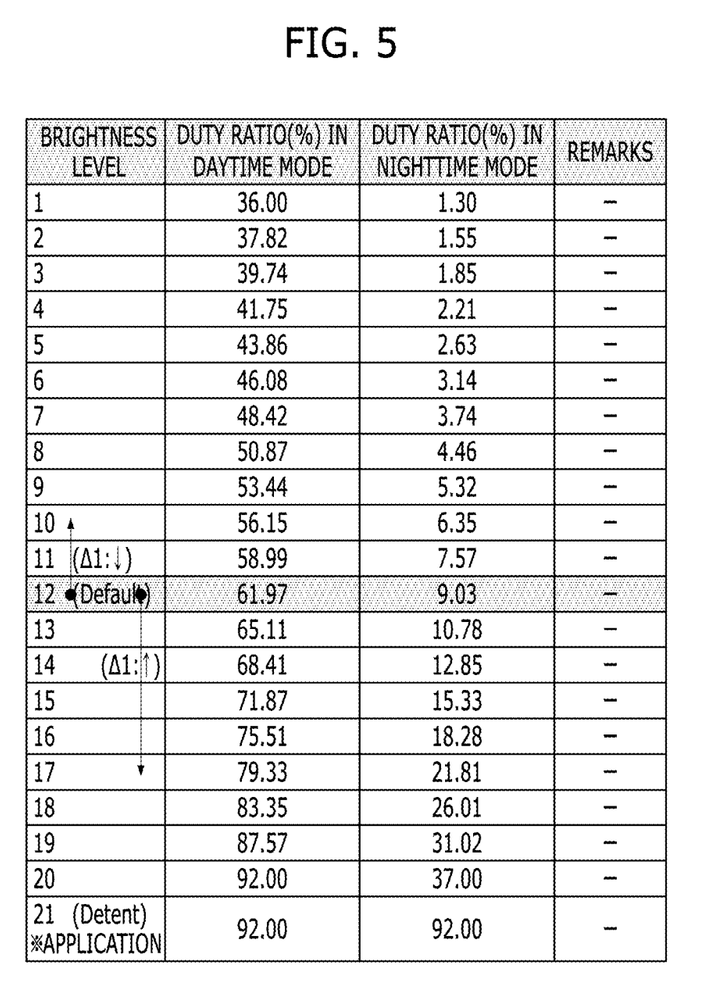
FIG. 5 is a lookup table for explaining a method of controlling the luminance of the vehicle lighting device according to the embodiment of the present disclosure.

FIG. 5 is a lookup table for explaining the method of controlling the luminance of the vehicle lighting device according to the embodiment of the present disclosure.

The levels in which the luminance of the lighting unit 130 is controlled include 21 levels. The duty ratios at which the lighting unit 130 is driven in the daytime mode and the nighttime mode are set differently for the respective levels.

When a new vehicle is manufactured, the $12^{th}$ level is set as a default level. In other words, the duty ratio at which the lighting unit 130 is driven in the daytime mode is set to 61.97 and the duty ratio at which the lighting unit 130 is driven in the nighttime mode is set to 9.03.

For example, through the repetition of steps 5S-8S, when the brightness level (IR light quantity) has been lowered from the $12^{th}$ level by two levels (i.e. to the $10^{th}$ level), the duty ratio at which the lighting unit 130 is driven in the daytime mode is controlled to 56.15. Likewise, the duty ratio at which the lighting unit 130 is driven in the nighttime mode for the $10^{th}$ level is controlled to 6.35.

For example, through the repetition of steps 5S-8S, when the brightness level (IR light quantity) has been raised from the $12^{th}$ level by five levels (i.e. to the $17^{th}$ level), the duty ratio at which the lighting unit 130 is driven in the daytime mode is controlled to 79.33. Likewise, the duty ratio at which the lighting unit 130 is driven in the nighttime mode for the $17^{th}$ level is controlled to 21.81.

In the same manner, through the repetition of steps 5S-8S, when the current luminance of the lighting unit 130 corresponds to the $17^{th}$ level and the brightness level (IR light quantity) has been lowered by three levels (i.e. to the $14^{th}$ level), the duty ratio at which the lighting unit 130 is driven in the daytime mode is controlled to 68.41. Likewise, the duty ratio at which the lighting unit 130 is driven for the $14^{th}$ level in the nighttime mode is controlled to 12.85.

In FIG. 5, the $21^{st}$ level (detent) is a level at which the driver is capable of manually controlling the luminance of the lighting unit 130 to ultra-high luminance.

In another embodiment of the present disclosure, the size of the driver's pupil may be detected. The luminance of the vehicle lighting device may be controlled in response to the detected size of the driver's pupil.

Figure 6:
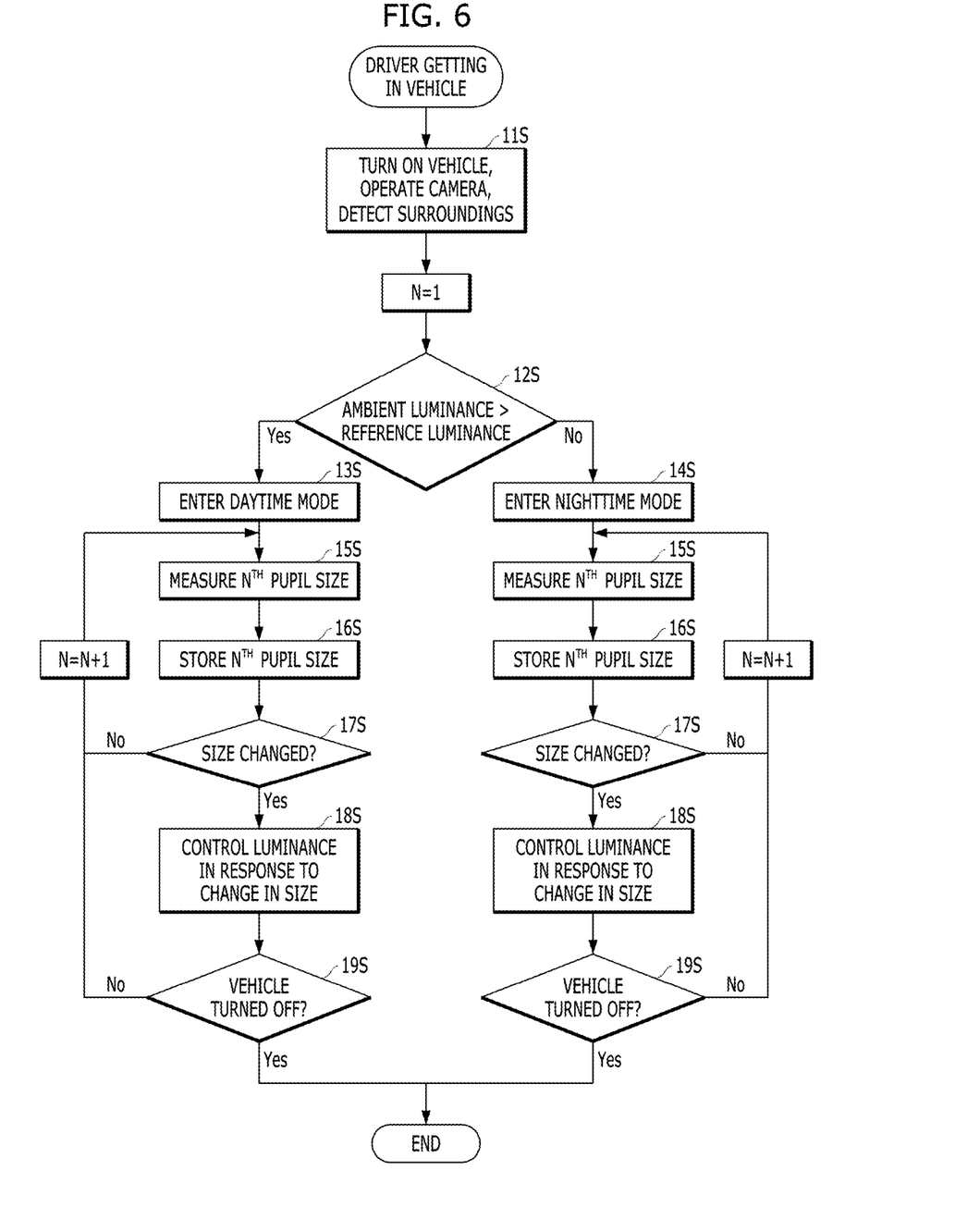
FIG. 6 is a flowchart showing an example of a control process of the vehicle lighting device according to a second embodiment of the present disclosure, in which the size of the driver's pupil is detected, and the luminance of the vehicle lighting device is controlled in response to the detected size of the driver's pupil.
Figure 7:
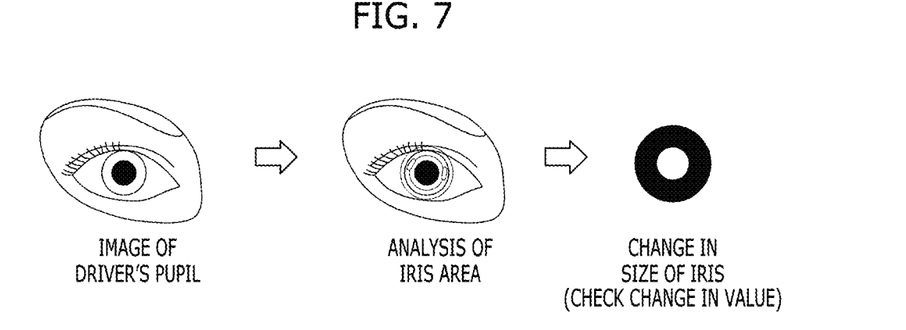
FIG. 7 is an image for explaining a process of measuring the size of the driver's pupil captured by the camera module 110.

FIG. 6 is a flowchart showing an example of a control process of the vehicle lighting device according to a second embodiment of the present disclosure. In this embodiment, the size of the driver's pupil is detected, and the luminance of the vehicle lighting device is controlled in response to the detected size of the driver's pupil. FIG. 7 is an image for explaining a process of measuring the size of the driver's pupil captured by the camera module 110.

In the method of controlling the vehicle lighting device according to the second embodiment of the present disclosure, as shown in FIG. 6, when the vehicle is turned on, power is supplied to the controller 140, the camera module 110, and the sensing unit 120. This operates the vehicle lighting device according to the present disclosure (11S).

The controller 140 compares the ambient luminance detected by the luminance sensor 121 of the sensing unit 120 with a reference luminance (12S).

Upon determining that the ambient luminance detected by the luminance sensor 121 is higher than the reference luminance, the controller 140 enters a daytime mode (13S).

Upon determining that the ambient luminance detected by the luminance sensor 121 is equal to or lower than the reference luminance, the controller 140 enters a nighttime mode (14S).

In the daytime mode, the headlights of the vehicle are turned off. In the nighttime mode, the headlights of the vehicle are automatically turned on.

The camera module 110 captures an image of the driver's pupil and transmits the captured image of the pupil to the controller 140.

As shown in FIG. 7, in each of the daytime mode and the nighttime mode, the controller 140 analyzes the iris (pupil) area, measures the size of the iris (pupil) in the captured image of the driver's pupil (15S), and stores the measured size of the iris (pupil) (16S).

The size of the iris (pupil) may be measured 54 times per second.

This process is performed at least twice in order to determine whether or not the measured size of the iris (pupil) has changed (17S).

When it is determined in step 17S that the size of the iris (pupil) has not changed, the current luminance of the lighting unit 130 is maintained.

When it is determined in step 17S that the size of the iris (pupil) has changed, the luminance of the lighting unit 130 is controlled in response to the change in the size of the iris (pupil) (18S).

The steps 15S-18S are repeated in order to control the luminance of the lighting unit 130 in response to a change in the size of the iris (pupil).

The above-described process is repeated in order to control the luminance of the lighting unit 130 in response to a change in the size of the iris (pupil). When the vehicle is turned off, the process of controlling the vehicle lighting device according to the second embodiment of the present disclosure is terminated (19S).

The method of controlling the luminance of the lighting unit 130 in response to the change in the size of the iris (pupil) is described below in more detail.

As described above with reference to the lookup table in FIG. 5, the levels in which the luminance of the lighting unit 130 is controlled include 21 levels. The duty ratios at which the lighting unit 130 is driven in the daytime mode and the nighttime mode are set differently for the respective levels.

The size of the iris (pupil) increases in a dark place, and decreases in a bright place. Therefore, when the size of the iris (pupil) has changed to a larger size, it is recognized that the interior of the vehicle has become darker, and when the size of the iris (pupil) has changed to a smaller size, it is recognized that the interior of the vehicle has become brighter.

On the basis of the lookup table in FIG. 5, when the size of the iris (pupil) has changed to a larger size, the luminance of the lighting unit 130 is controlled so as to correspond to a lower level. Conversely, when the size of the iris (pupil) has changed to a smaller size, the luminance of the lighting unit 130 is controlled so as to correspond to a higher level.

When a new vehicle is manufactured, the 12$^{th}$ level is set as a default level. In other words, the duty ratio at which the lighting unit 130 is driven in the daytime mode is set to 61.97 and the duty ratio at which the lighting unit 130 is driven in the nighttime mode is set to 9.03.

For example, through the repetition of steps 15S-18S, when the size of the iris (pupil) has increased by a degree corresponding to two levels, the brightness level is lowered from the 12$^{th}$ level to the 10$^{th}$ level. The result is that the duty ratio at which the lighting unit 130 is driven in the daytime mode is controlled to 56.15 and the duty ratio at which the lighting unit 130 is driven in the nighttime mode is controlled to 6.35.

For example, through the repetition of steps 15S-18S, when the size of the iris (pupil) has decreased by a degree corresponding to five levels, the brightness level is raised from the 12$^{th}$ level to the 17$^{th}$ level. The result is that the duty ratio at which the lighting unit 130 is driven in the daytime mode is controlled to 79.33 and the duty ratio at which the lighting unit 130 is driven in the nighttime mode is controlled to 21.81.

In the same manner, through the repetition of steps 15S-18S, when the current luminance of the lighting unit 130 corresponds to the 17$^{th}$ level and the size of the iris (pupil) has increased by a degree corresponding to three levels, the brightness level is lowered from the 17$^{th}$ level to the 14$^{th}$ level. The result is that the duty ratio at which the lighting unit 130 is driven in the daytime mode is controlled to 68.41, and the duty ratio at which the lighting unit 130 is driven in the nighttime mode is controlled to 12.85.

As described above, the 21$^{st}$ level (detent) is a level at which the driver is capable of manually controlling the luminance of the lighting unit 130 to ultra-high luminance.

In another embodiment of the present disclosure, the first embodiment and the second embodiment of the present disclosure may be combined.

In other words, when the ambient luminance detected by the luminance sensor 121 is higher than the reference luminance, the controller 140 enters a daytime mode. When the ambient luminance detected by the luminance sensor 121 is equal to or lower than the reference luminance, the controller 140 enters a nighttime mode.

As described in the first embodiment of the present disclosure, the camera module 110 captures an image of the driver's face. The controller 140 analyzes the captured image, repeatedly measures, depending on the number of specific points appearing in the captured image of the driver's face, the IR brightness level (the IR light quantity of the camera), and determines whether or not the measured brightness level (IR light quantity) has changed.

In addition, as described in the second embodiment of the present disclosure, the controller 140 analyzes the iris (pupil) area. The controller 140 repeatedly measures the size of the iris (pupil) in the image of the driver's face captured by the camera module 110 and determines whether or not the measured size of the iris (pupil) has changed.

When it is determined that neither the measured brightness level (IR light quantity) nor the measured size of the iris (pupil) has changed, the current luminance of the lighting unit 130 is maintained.

When it is determined that the measured brightness level (IR light quantity) or the measured size of the iris (pupil) has changed, the luminance of the lighting unit 130 is controlled in response to the change in the measured brightness level (IR light quantity) or the change in the measured size of the iris (pupil).

In other words, as described with reference to FIG. 5, the duty ratios at which the lighting unit 130 is driven in the daytime mode and the nighttime mode are controlled in response to the degree (amount) of change in the measured brightness level (IR light quantity) or the degree (amount) of change in the measured size of the iris (pupil).

As is apparent from the above description, according to a vehicle lighting device and a method of controlling luminance thereof according to the embodiments of the present disclosure, it is possible to control indoor (vehicle interior) illumination by detecting a change in the IR light quantity of a camera and/or a change in the size of the driver's pupil without additionally mounting a separate luminance sensor in the interior of the vehicle.

In addition, it is possible to control the vehicle lighting device using one camera module rather than an expensive luminance sensor. The cost of manufacturing the vehicle is thereby reduced and the structure of the vehicle is thereby simplified.

In addition, since the luminance of a display device is controlled in response to the indoor (vehicle interior) situation of the vehicle, it is possible to improve visibility.

It should be apparent to those having ordinary skill in the art that various changes in form and details of the disclosed embodiments may be made without departing from the spirit and essential characteristics of the disclosure set forth herein. Accordingly, the above detailed description is not intended to be construed to limit the disclosure in all aspects and is instead to be considered by way of example. The scope of the disclosure should be determined by reasonable interpretation of the appended claims and all equivalent modifications made without departing from the disclosure should be included in the following claims.

What is claimed is:

1. A vehicle lighting device, comprising:
   a camera module configured to capture an image of a face of a driver;
   a sensing unit configured to detect surroundings of a vehicle;
   a lighting unit comprising at least one light source to illuminate an interior of the vehicle; and
   a controller configured to acquire information on a daytime mode and a nighttime mode through the sensing unit, to acquire information on an infrared brightness level or information on a size of a pupil of an eye of the driver based on an image of the face of the driver captured by the camera module, and to control luminance of the lighting unit in response to acquired information.

2. The vehicle lighting device according to claim 1, wherein the sensing unit comprises at least one of:
   a luminance sensor configured to detect luminance of external light entering the vehicle;
   a rain sensor configured to measure an amount of rainfall or an amount of snowfall; or
   a direction sensor configured to acquire a direction of natural light.

3. The vehicle lighting device according to claim 1, wherein the controller repeatedly measures the infrared brightness level based on a number of specific points appearing in the captured image of the face of the driver and controls the luminance of the lighting unit in response to a change in the measured infrared brightness level.

4. The vehicle lighting device according to claim 1, wherein the controller repeatedly measures a size of the pupil of the eye of the driver in the captured image of the face of the driver and controls the luminance of the lighting unit in response to a change in the measured size of the pupil.

5. The vehicle lighting device according to claim 1, wherein the lighting unit comprises at least one of a sun visor lighting element, a cluster lighting element, a display lighting element, a button lighting element, a mood lamp, a map lamp, or an ambient lamp.

6. A method of controlling luminance of a vehicle lighting device, the method comprising:

determining a daytime mode or a nighttime mode based on an ambient luminance detected by a luminance sensor;

capturing an image of a face of a driver through a camera module and repeatedly measuring an infrared brightness level from the captured image of the face of the driver; and controlling luminance of a lighting unit for the daytime mode or the nighttime mode in response to a change in the measured infrared brightness level.

7. The method according to claim 6, wherein the measuring the infrared brightness level from the captured image of the face of the driver comprises measuring the infrared brightness level based on a number of specific points appearing in the captured image of the face of the driver.

8. The method according to claim 6, wherein the controlling the luminance of the lighting unit comprises:

establishing a lookup table in which a plurality of levels based on which the luminance of the lighting unit is controlled is set and in which duty ratios at which the lighting unit is driven in the daytime mode and the nighttime mode are respectively set in the plurality of levels;

selecting a level by lowering or raising a current level, among the plurality of levels, in response to a change in the infrared brightness level; and driving the lighting unit at a duty ratio of a daytime mode or a nighttime mode corresponding to the selected level.

9. The method according to claim 8, wherein an intermediate level, among the plurality of levels, is set as a default level when a vehicle is manufactured.

10. The method according to claim 8, wherein a highest level, among the plurality of levels, is a level at which the driver is allowed to manually control the luminance of the lighting unit to ultra-high luminance.

11. A method of controlling luminance of a vehicle lighting device, the method comprising:

determining a daytime mode or a nighttime mode based on an ambient luminance detected by a luminance sensor;

capturing an image of a pupil of a driver through a camera module and repeatedly measuring a size of the pupil of the driver in the captured image; and controlling luminance of a lighting unit for the daytime mode or the nighttime mode in response to a change in the measured size of the pupil of the driver.

12. The method according to claim 11, wherein the controlling the luminance of the lighting unit comprises:

establishing a lookup table in which a plurality of levels based on which the luminance of the lighting unit is controlled is set and in which duty ratios at which the lighting unit is driven in the daytime mode and the nighttime mode are respectively set in the plurality of levels;

selecting a level by lowering or raising a current level, among the plurality of levels, in response to a change in the size of the pupil of the driver; and driving the lighting unit at a duty ratio of a daytime mode or a nighttime mode corresponding to the selected level.

13. The method according to claim 12, wherein an intermediate level, among the plurality of levels, is set as a default level when a vehicle is manufactured.

14. A method of controlling luminance of a vehicle lighting device, the method comprising:

determining a daytime mode or a nighttime mode based on an ambient luminance detected by a luminance sensor;

capturing an image of a face of a driver through a camera module and repeatedly measuring an infrared brightness level from the captured image of the face of the driver;

capturing an image of a pupil of the driver through the camera module and repeatedly measuring a size of the pupil of the driver in the captured image;

calculating a change in the measured infrared brightness level;

calculating a change in the measured size of the pupil of the driver; and controlling luminance of a lighting unit for the daytime mode or the nighttime mode in response to the calculated change in the infrared brightness level and the calculated change in the size of the pupil of the driver.

15. The method according to claim 14, wherein the measuring the infrared brightness level from the captured image of the face of the driver comprises measuring the infrared brightness level based on a number of specific points appearing in the captured image of the face of the driver.

16. The method according to claim 15, wherein the controlling the luminance of the lighting unit comprises:

establishing a lookup table in which a plurality of levels based on which the luminance of the lighting unit is controlled is set and in which duty ratios at which the lighting unit is driven in the daytime mode and the nighttime mode are respectively set in the plurality of levels;

selecting a level by lowering or raising a current level, among the plurality of levels, in response to a change in the infrared brightness level and a change in the size of the pupil of the driver; and driving the lighting unit at a duty ratio of a daytime mode or a nighttime mode corresponding to the selected level.

* * * * *